(12) United States Patent
De Smet et al.

(10) Patent No.: US 8,634,429 B2
(45) Date of Patent: Jan. 21, 2014

(54) COMMUNICATION SYSTEM AND METHOD (75) Inventors: Bruno De Smet, Valbonne (FR); Flavien Delorme, Vence (FR)

(73) Assignee: NVIDIA, Santa Clara, CA (US)

( * ) Notice: Subject to any disclaimer, the term of this patent is extended or adjusted under 35 U.S.C. 154(b) by 147 days.

(21) Appl. No.: 13/253,417

(22) Filed: Oct. 5, 2011

(65) Prior Publication Data

US 2013/0089017 A1    Apr. 11, 2013

(51) Int. Cl.
*H04J 3/22* (2006.01)
*H04L 12/28* (2006.01)

(52) U.S. Cl.
USPC ............................ 370/401; 370/466; 455/500

(58) Field of Classification Search
USPC ......... 370/310, 312, 340, 341, 400, 401, 409; 455/500, 507, 509, 458
See application file for complete search history.

(56) References Cited

U.S. PATENT DOCUMENTS

| 2003/0095523 | A1* | 5/2003 | Korus et al. ................. 370/338 |
| 2010/0208703 | A1* | 8/2010 | Tinnakornsrisuphap et al. ............................ 370/331 |
| 2011/0103284 | A1* | 5/2011 | Gundavelli et al. .......... 370/312 |

* cited by examiner

*Primary Examiner* — Kerri Rose (57) ABSTRACT

An apparatus comprising a wireless modem for use at a terminal, the modem being adapted to connect to the terminal via a first connection, and to connect via a second, wireless connection to a gateway between a wireless cellular network and a further, packet-based network. The modem is operable to connect to the gateway via the second connection using a point-to-point link protocol that does not require a physical address for the gateway, and is operable to connect to the host terminal via the first connection using a point-to-multipoint link protocol that supports point-to-multipoint connection and does require a physical address for the gateway. The modem is configured to intercept a message being conveyed between the gateway and the terminal, to generate a substitute address that identifies an interface of the modem, and in response to intercepting the message to communicate the substitute address to the terminal.

29 Claims, 4 Drawing Sheets

COMMUNICATION SYSTEM AND METHOD

TECHNICAL FIELD

This application relates to link protocols.

BACKGROUND

Figure 1:
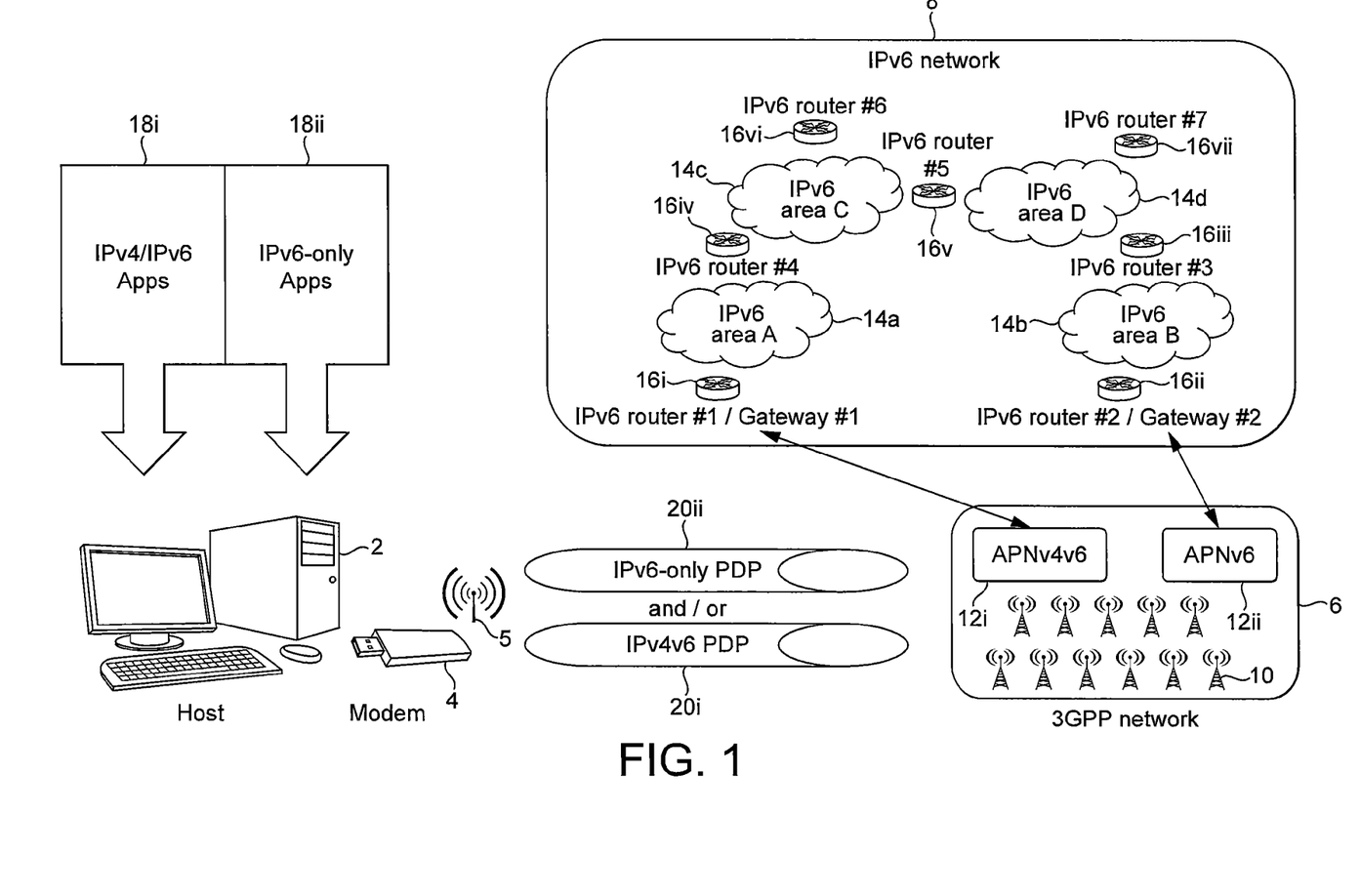
FIG. 1 is a schematic illustration of IPv6 connectivity over 3GPP network.

FIG. 1 is a schematic block diagram of a communication system comprising: a host terminal 2 such as a desktop computer, laptop computer, tablet style computer or mobile phone; a wireless cellular modem 4 comprising an antenna 5; a mobile cellular network 6 such as a 3GPP network comprising one or more access point nodes 12 (APNs) coupled to a plurality of antennas 10; and a further, packet-based network 8 such as the Internet comprising a plurality of areas 14 and routers or gateways 16. The system allows the host terminal to access the Internet 8, e.g. using Internet Protocol version 6 (IPv6) and/or Internet Protocol version 4 (IPv4).

The modem 4 is connected or connectable to the host terminal 4 by means of a first link. The modem is connected or connectable to the 3GPP network 6 or other such cellular network by means of a second connection 20. The second connection connects via an antenna 18 to an access point node (APN) of the cellular network 6. Each of the one or more access point nodes 12 connects on to a respective gateway 16 of the Internet 8. The host terminal 2 is installed with one or more applications 18 which when executed on the host terminal 2 send and/or receive communications over the Internet 8 via the first and second links.

The first connection, between the host and modem, comprises a physical connection and a link protocol that drives the physical connection. The physical connection could be for example a wired connection such as USB, an infrared connection, or a radio frequency connection such as Bluetooth. The link protocol is the protocol that operates at the link layer, i.e. which handles the transfer of data to or from just the next physical node (as opposed for example to internet layer protocol which routes across multiple nodes, or transport layer protocol which is concerned with end-to-end communication issues). For the purpose of link layer transmission, devices such as routers and gateways 16 and host terminals 4 may be allocated a physical identifier which may be referred to as a link layer address (LLA). The LLA or link-layer address is the unique link address of a device connected to a packet-based network 8 such as an IPv6 network.

SUMMARY

According to one aspect of the disclosure, there is provided an apparatus. In one embodiment, the apparatus includes a wireless modem for use at a terminal, the modem being adapted to connect to the terminal via a first connection, and to connect via a second, wireless connection to a gateway between a wireless cellular network and a further, packet-based network; wherein the modem is operable to connect to the gateway via the second connection using a point-to-point link protocol that does not require a physical address for the gateway, and is operable to connect to the host terminal via the first connection using a point-to-multipoint link protocol that supports point-to-multipoint connection and does require a physical address for the gateway; and wherein the modem is configured to intercept a message being conveyed between the gateway and the terminal, to generate a substitute address that identifies an interface of the modem, and in response to intercepting the message to communicate the substitute address to the terminal.

According to another aspect of the disclosure, there is provided a method of operating a wireless modem for use at a terminal, the modem being adapted to connect to the terminal via a first connection, and to connect via a second, wireless connection to a gateway between a wireless cellular network and a further, packet-based network. In one embodiment, the method includes: connecting the modem to the gateway via the second connection using a point-to-point link protocol that does not require a physical address for the gateway; connecting the modem to the host terminal via the first connection using a point-to-multipoint link protocol that supports point-to-multipoint connection and does require a physical address for the gateway; operating the modem to intercept a message being conveyed between the gateway and the terminal; at the modem, generating a substitute address that identifies an interface of the modem; and in response to intercepting the message, communicating the substitute address from the modem to the terminal.

According to another aspect of the disclosure, there is provided a computer program product for operating a wireless modem for use at a terminal, the modem being adapted to connect to the terminal via a first connection, and to connect via a second, wireless connection to a gateway between a wireless cellular network and a further, packet-based network. In one embodiment, the computer program product comprises code embodied on a non-transitory computer-readable medium and configured so as when executed on the modem to perform operations of: connecting the modem to the gateway via the second connection using a point-to-point link protocol that does not require a physical address for the gateway; connecting the modem to the host terminal via the first connection using a point-to-multipoint link protocol that supports point-to-multipoint connection and does require a physical address for the gateway; operating the modem to intercept a message being conveyed between the gateway and the terminal; at the modem, generating a substitute address that identifies an interface of the modem; and in response to intercepting the message, communicating the substitute address from the modem to the terminal.

BRIEF DESCRIPTION

For a better understanding of the application and to show how it may be put into effect, reference by way of example is made to the accompanying drawings in which.

DETAILED DESCRIPTION

A link protocol could be a point-to-point protocol such as PPP which can only ever connect to a single endpoint of the connection in question, or a point-to-multipoint protocol such as Ethernet which can support multiple endpoints of the connection. For example, in embodiments the connection may be operable in different modes so as to be able to be driven by either a point-to-point link protocol such as PPP or a point-to-multipoint link protocol Ethernet so as to provide both PPP and Ethernet interfaces. These may be used for example to drive a wired connection such as a USB connection. In other words the host can select the type of connection it is to use to communicate with the modem. In alternative embodiments the modem may only be configured to use one fixed protocol such as a point-to-multipoint protocol like Ethernet.

Sometimes a point-to-multipoint link protocol is used even if there is actually only one end-point of the link connected, e.g. only the modem connecting on to only a single gateway is connected to the host via the physical connection in question. There may be two possible reasons for this. Firstly, PPP is highly consuming of time and CPU resources at high bitrates, such as at bitrates than can be reached with LTE (Long Term Evolution). Ethernet provides better performances. Secondly, Ethernet may be the interface preferred by certain customers or used as the standard or default protocol in certain circumstances.

However, when a host equipment tries to obtain internet connectivity on a cellular network via a modem, a configuration issue may occur. For example this issue may occur if the host tries to use the modem to get IPv6 connectivity on 3GPP network. If the host is connected to the modem though a point-to-multipoint connection, then a 3GPP network or other such cellular network expecting a point-to-point connection might not provide the required support and preclude any user data traffic.

A physical connection may be shared by more than two devices or not. If only two devices can be connected via this physical connection, then the connection may be referred to as a point-to-point connection and the protocol that drives it is designed to handle only point-to-point connection (e.g. PPP).

If more than two devices are (or could be) connected via this physical connection, then this may be referred to as a point-to-multipoint connection and the protocol that drives it is designed to handle point-to-multipoint connection (e.g. Ethernet). In one embodiment the modem can be connected to a host with an USB cable and provides both interfaces: PPP and Ethernet, i.e. so the host can choose the desired connection to communicate with the modem. In order to connect the host to the Internet, the end user may use a connection manager. This connection manager may for example use the PPP interface or the Ethernet interface (implementation dependant). The IP stack embedded on host side will then behave differently according to the kind of connection. As mentioned, sometimes a point-to-multipoint link protocol is used even if there is actually only one end-point of the link connected.

If the connection is a point-to-point connection, then the IP stack or other such protocol stack on the host side need only send any packet through the wire in order to reach the modem, as the only reachable device is the modem.

If the connection is a point-to-multipoint connection on the other hand, then the IP stack on host side first needs to obtain a physical identifier of the modem as there could be another device connected to this physical connection. For example the physical identifier could be a Link Layer Address (LLA). The protocol that drives the connection needs to know a physical identifier for the destination in order to send the IP packets to the right device. The IP stack on host side will not send user data if this procedure is not achieved successfully. This issue will arise with a point-to-multipoint link protocol even if the modem connecting on to a single gateway happens to be the only actual end-point present on that connection, because the protocol is designed in such a way that it expects a physical destination address such as an LLA and will not operate without one.

The IP stack on host side will behave the same way with any other device it wants to reach on the Internet (e.g. an IPv6 router) as it assumes that the physical connection between the host and the modem is also shared with any other device connected to the network.

The connection between the modem and a 3GPP network may be called a PDP (Packet Data Protocol) context in 2G or 3G terminology, and an EPS (Evolved Packet System) bearer context in LTE. The physical interface is a radio interface (e.g. 2G, 3G, or LTE) and the protocol that drives it is a set of protocol layers as defined for example by 3GPP. This is a point-to-point connection: one PDP or bearer context connects one single modem to the APN node. This connection may comprise multiple contexts, but each context is its own point-to-point connection. The first IPv6 router (or such like) is the gateway between the cellular network and the Internet. This router knows its connection with the modem is a point-to-point connection. In this case, the gateway router may not send its physical address to the modem when communicating with the host via the modem. For example, as specified in RFC2461, this router does not have to send its LLA (within Router Advertisement or Neighbor Advertisement).

The consequence of the above is that if the connection between the host and the modem is a point-to-multipoint connection, the IP stack on host side will never get the physical identifier (LLA) of the first IPv6 router and then will never proceed with user data transmission. A similar issue may occur wherever host equipment tries to obtain internet connectivity on a cellular network via a modem and the connection between host and modem is driven by a point-to-multipoint link protocol whilst the connection between modem and cellular network is driven by a point-to-point link protocol.

As provided herein, the disclosed embodiments solve this issue by moving the physical address resolution handling (e.g. Link Layer Address resolution) from the network to the modem. Instead of transparently transmitting IP packets as it is supposed to, the modem will intercept ICMPv6 packets or such like (e.g., a message) and act as a router between the host and the 3GPP network or other such cellular network. The modem can be included in an apparatus as disclosed herein.

In embodiments, the intercepted message may be transmitted from gateway to a terminal without a physical address for the gateway being included in the message, and the modem may be configured, in response to intercepting the message, to modify the message so as to include the substitute address, and to communicate the substitute address to the terminal by routing the message to the terminal via the first connection following the modification.

The message may be one of a neighbour advertisement message and a router advertisement message from the gateway.

The message may be transmitted from the terminal to the gateway with a specified physical source address for the terminal being included in the message, and the modem may be configured, in response to intercepting the message, to prevent the message being transmitted on to the gateway and instead to return a response including the substitute address to the terminal via the first connection.

The message may be one of a neighbour solicitation message and a router solicitation message from the terminal.

The point-to-multipoint link protocol may allow for neighbour solicitation messages with an unspecified physical source address, and the modem may be configured such that the prevention of the message being transmitted on to the gateway and the response to the terminal are conditional on the neighbour solicitation message comprising a specified physical source address, whereas a neighbour solicitation message comprising the unspecified address may not be prevented from being transmitted on to the gateway.

The modem may be configured to operate in a selected one of at least two available modes, a mode in which the modem uses the point-to-multipoint link protocol on the first connection and a mode in which the modem uses a point-to-point link protocol on the first connection, wherein the modem may be configured to intercept the message on condition that the point-to-multipoint link protocol is currently being used.

The second, connection between the modem and the gateway, may comprise a plurality of point-to-point connections in the form of a plurality of contexts, and the modem may be configured to intercept messages on each of the contexts.

The point-to-multipoint link protocol may be an Ethernet protocol.

The first connection, between the modem and the terminal, may be a wired connection.

In one embodiment, an apparatus may comprise a dongle housing the wireless modem for plugging into the terminal.

A disclosed apparatus may comprise the terminal, wherein the terminal may be a user terminal in the form of one of a desktop computer, a laptop computer, a tablet and a mobile telephone, and wherein the wireless modem may be housed within the user terminal.

The first connection, between the modem and the terminal, may be a local wireless connection.

In addition to disclosing an apparatus including the modem, the disclosure also provides a method of operating a wireless modem for use at a terminal and a computer program product for operating a wireless modem for use at a terminal. In embodiments, the method may include operations in accordance with the operation of any of the above apparatus features. In embodiments, the code may be further configured so as when executed to perform operations in accordance with the operation of any of the above apparatus features.

Reference is made again to FIG. 1, which shows a communication system in which embodiments of the disclosure may be applied. The host 2 may be any device such as a PC, laptop, or application processor connected to the modem 4 in order to get access to the packet-based network 8 via the modem 4 and cellular network 6, e.g. to get IPv6 connectivity and send and/or receive IPv6 traffic. The modem 4 is the device that provides a way to send and receive packets between the host 2 and cellular network 6, e.g. to send and receive IPv6 packets between the host and the 3GPP network. The modem 4 may comprise a processor, and a non-transitory storage medium such as a magnetic or electronic memory storing soft-modem code arranged to be executed on the processor, so as when executed to send and receive packets between the host 2 and cellular network 6 and perform the operations of the modem 4 as discussed below. However, the possibility of some or all of the modem functionality being implemented in dedicated hardware is not excluded. The cellular network 6 is preferably a 3GPP network, which connects the modem 4 to the IPv6 network. A connection could be made of one or several bearer (s) called PDP context(s). A "node" may be any device connected to the IPv6 network or other such packet-based network 8 that can send and receive IPv6 packets through a specific interface. As mentioned, for the purpose of link layer transmission, devices such as routers and gateways 16 and host terminals 4 may be allocated a physical identifier which may be referred to as a link layer address (LLA). The LLA or link-layer address is the unique link address of a device connected to a packet-based network 8 such as an IPv6 network.

The second connection, i.e. the connection between the modem 4 and the APN 12 of the cellular 3GPP network, and therefore between the modem 4 and gateway 16 to the IPv6 network 8, comprises one or more contexts 20 in the form of one or more PDP contexts or one or more EPS bearer contexts. In an application of the disclosure, each context only provides a point-to-point connection between the modem 4 and the relevant gateway 16.

The modem 4 however may be configured to support two different use cases in relation to the first connection between the host 2 and modem 4.

In the first, there is provided a point-to-point connection between host 2 and modem 4, that is to say, a physical connection driven by a point-to-point link protocol. This is a connection that connects only two endpoints of the immediate physical link in question (the first connection between the host 2 and modem 4). In this case, as the only reachable device is the modem and so the host side need only send any packet through the wire in order to reach the modem (or more generally through the physical link, as in embodiments the local link between modem 4 and host 2 could be wired or could be a wireless local connection such as Bluetooth or other local RF link). This results in no issue in relation to the second connection being also a point-to-point connection.

In the second case however, there is provided a point-to-multipoint connection between host 2 and modem 4, that is to say, a physical connection driven by a point-to-multipoint link protocol. This is a connection that has the potential to connect more than two endpoints of the physical link in question (the first connection between the host 2 and modem 4). In this case a link protocol is required in order to route packets from one source to the right destination. This may be true even if only one endpoint happens to be connected at the time, e.g. only the modem 4 connecting only to a single gateway 16, since by its nature the point-to-multipoint link protocol is designed in such a way as to expect a destination LLA address such that it will not operate without one.

A problem may therefore occur, in that a 3GPP network 6 expecting a point-to-point connection might not provide the required support and may prevent any user data traffic. The LLA resolution feature according to some embodiments of the disclosure resolves this issue.

Figure 2:
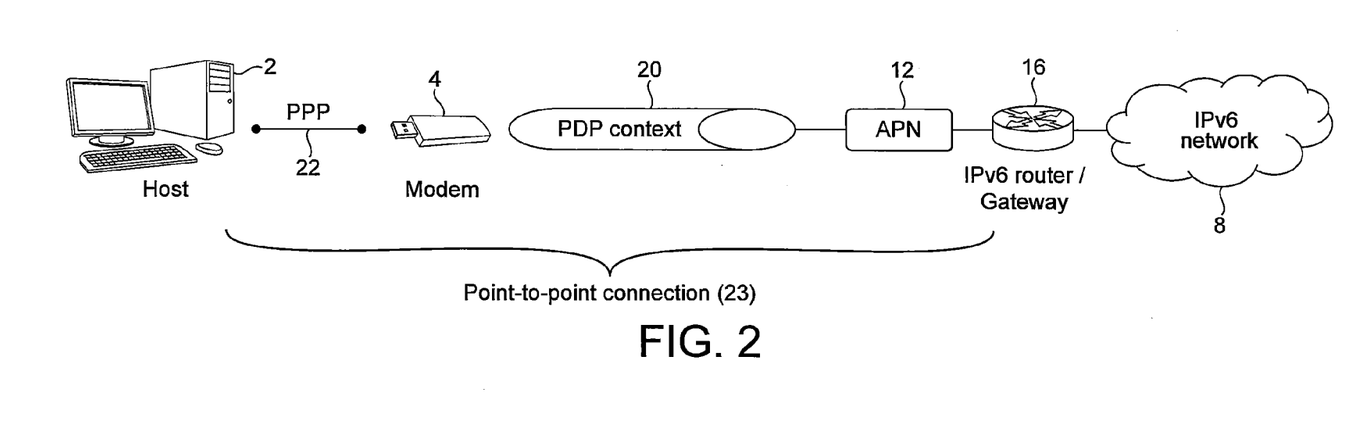
FIG. 2 schematically illustrates a connection comprising a point-to-point connection between host and modem, FIG. 3 schematically illustrates a connection comprising a point-to-multipoint connection between host and modem.

FIG. 2 schematically illustrates a purely point-to-point connection 23 comprising: a point-to-point connection 22 between the host 2 and modem 4, e.g. in the form of a physical USB connection driven by PPP (Point-to-Point Protocol); and a point-to-point connection 20 between the modem 4, e.g. in the form of one or more PDP or EPS bearer contexts 20 (each being an individual respective point-to-point connection in the case where there are multiple contexts). Here there is the same connection type (point-to-point) all the way from host 2 towards the IPv6 network 8. The host 2 does not require any link layer address to send packets to the IPv6 network 8. Packets will use one unique route between the host and the gateway, so there is no issue.

Figure 3:
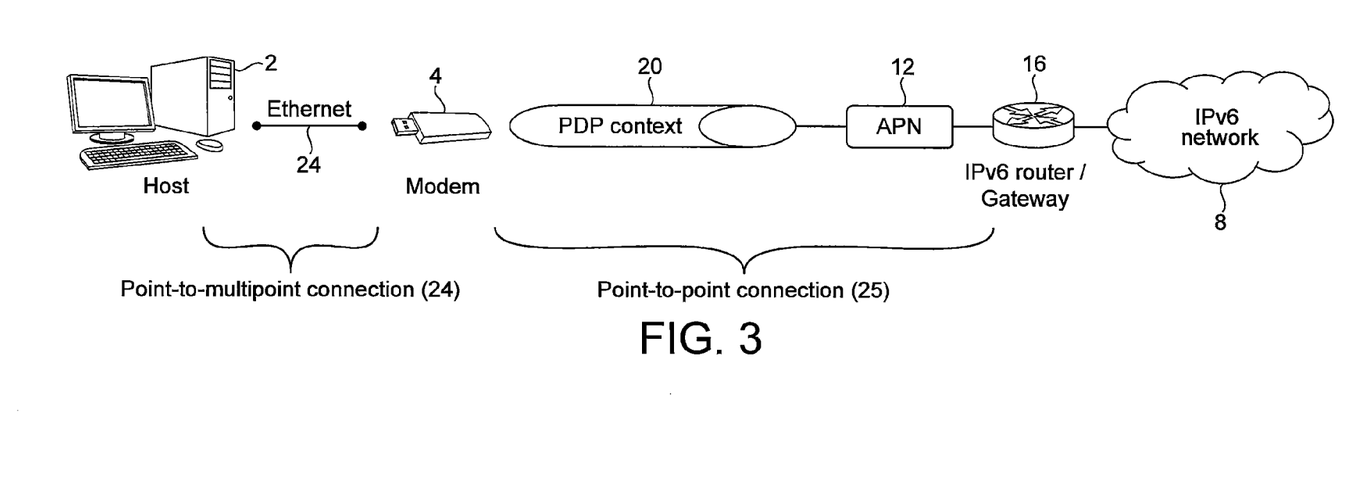

FIG. 3 schematically illustrates a mixed type connection comprising a point-to-multipoint connection 24 between the host 2 and modem 4, e.g. in the form of a physical USB connection driven by an Ethernet protocol; and a point-to-point connection 20 between the modem 4, e.g. in the form of one or more PDP contexts or EPS bearer contexts 20 (again each being an individual respective point-to-point connection in the case where there are multiple contexts). In this case there are different connection types along the path from host 2 to the IPv6 network 8. The host 2 does require a link layer address to send packets to the right modem interface. Several routes are potentially possible between the host 2 and the modem 4 as far as the point-to-multipoint link protocol knows (even if only one route actually happens to exist in the circumstances).

The host 2 would conventionally rely on the LLA of the gateway 16 to identify the route between the modem 4 and itself. However, the gateway 16 may not send its LLA if it has connected to the modem 4 via a point-to-point connection (e.g. PDP contexts or EPS bearer context) as in the example illustrated in FIG. 3. This means no user data traffic is possible if the host 2 does not receive this LLA.

In some embodiments, the LLA resolution handling is moved into the modem 4.

Any control message that requests/sends LLA from/to the host 2 should be intercepted and/or changed by the modem 4. If one of these packets has to be changed, the modem recalculates the checksum in the transport header (ICMPv6). The modem is configured to 4 generate the LLA such that the LLA identifies the uplink route (i.e. the PDP context or EPS bearer context from the host to the APN) to be used for further uplink user data traffic. Any further uplink packet from the host is routed by the modem 4 to the right interface according to the LLA. On host side 2 the link layer protocol adds a link layer header before the uplink packet. This link layer header contains the link layer address (LLA) that is read by the modem. Hence the modem 4 acts like a router (not a bridge as it would do conventionally).

The disclosure can be applied to any system including a host, a modem, a gateway and an IPv6 network where the connection between the modem and the gateway is a P2P connection and the connection between the host and the modem is a P2MP connection.

Figure 4:
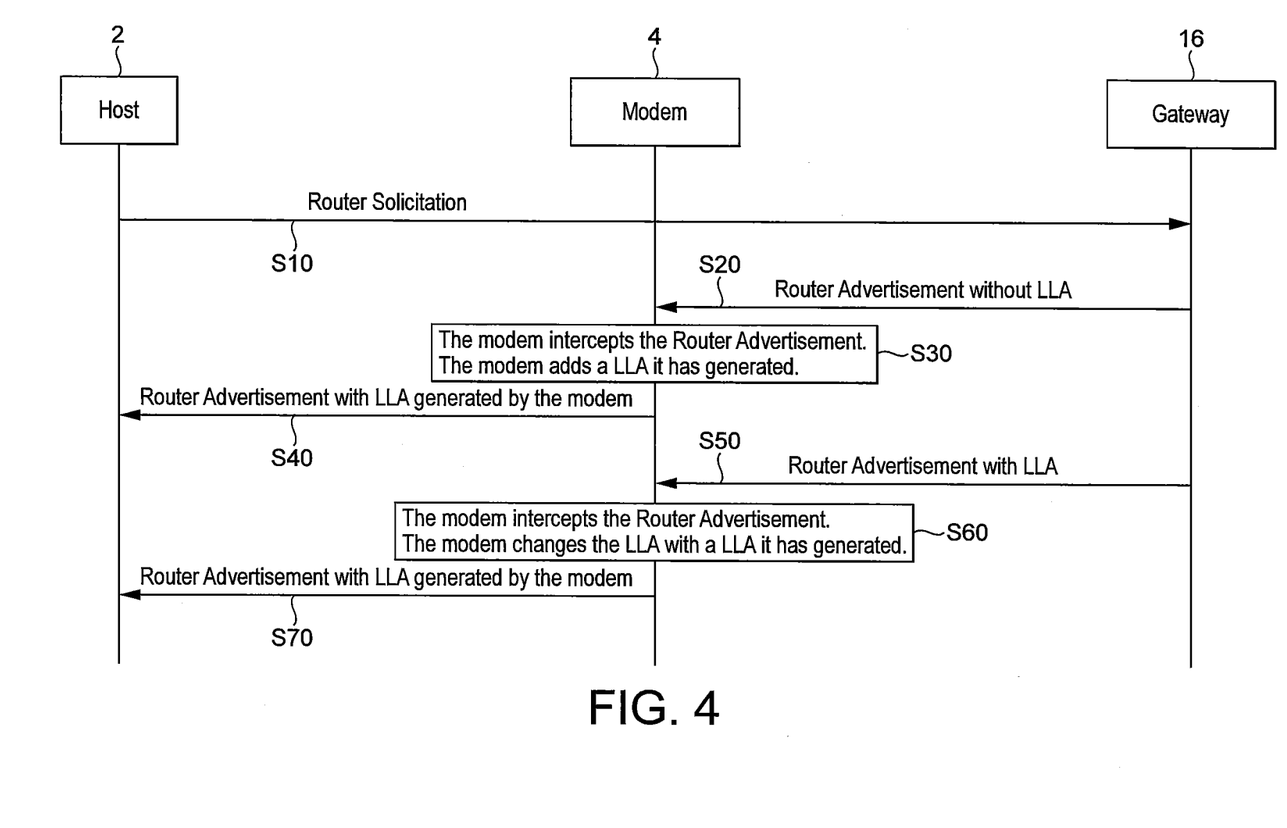
FIG. 4 is a signalling chart of a router advertisement and solicitation method.

FIG. 4 is a signalling chart illustrating methods of router advertisement and router solicitation. Messages of these types are included for example in the protocol ICMPv6 (Internet Control Message Protocol v.6). They may be defined for example in RFC4861. The router discovery procedure using these messages allows the host to find a local router and learn important information about the router and the network such as IPv6 prefix and MTU (maximum transmission unit).

At step S10 a Router Solicitation message is sent by the host 2 to all nodes, including at least the gateway 16, in order to request any router in the network to send Router Advertisement. In response at step S20 the gateway replies with a Router Advertisement. Alternatively or additionally, at step S50 the gateway 16 may unilaterally send out a Router Advertisement message, including at least one destined for the host 2. Note that steps S10 to S40 are not necessarily part of the same process as steps S50 to S70, but are included on the same signaling chart for conciseness.

Either way, the Router Advertisement message is sent by the router 16 and may not contain its LLA.

In embodiments of the disclosure, at step S30 (in response to intercepting the Advertisement message of step S20) and/or at step S60 (in response to intercepting the Advertisement message of step S50) the modem 4 is configured to modify any Router Advertisement by changing (or adding if not present) the LLA that it will generate itself. At step S40 and/or S70 respectively, the modem forwards this modified Advertisement message on to the host 2, including the modified LLA address. This LLA will identify the interface between the modem 4 and the host 2 for this route.

Figure 5:
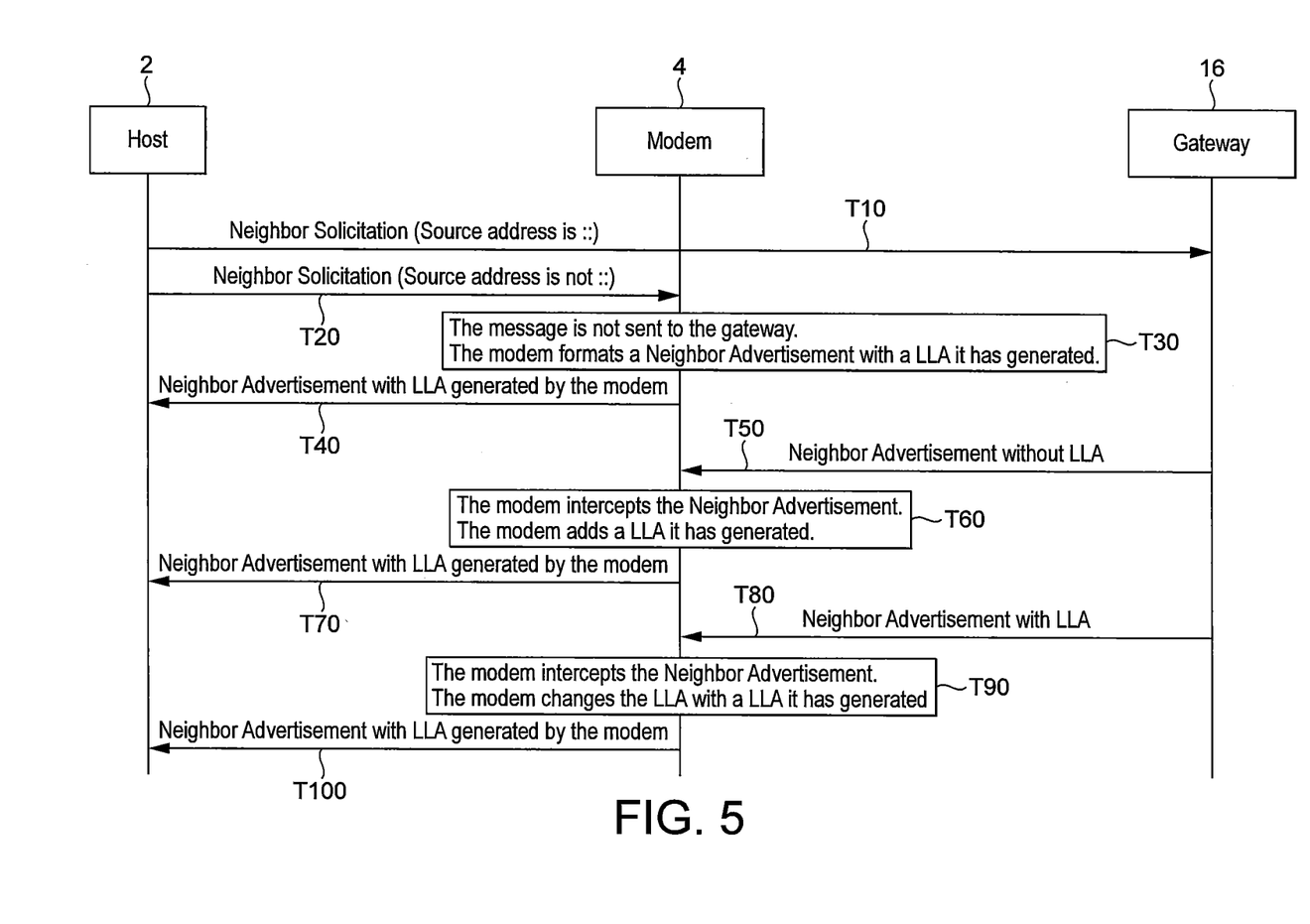
FIG. 5 is a signalling chart of a neighbour advertisement and solicitation method.

FIG. 5 is a signalling chart illustrating methods of neighbour advertisement and router solicitation. Messages of these types are included for example in the protocol ICMPv6. They may be defined for example in RFC4861. Neighbour discovery mainly serve two purposes: firstly, to check if a neighbour (host or router) exists; and secondly, to check if an autoconfigured address is not already used by another host. It also provides useful information about the network such as nexthop. Neighbour solicitation and advertisement are related to router solicitation and advertisement, but not the same thing.

Note that steps T10, steps T20 to T40, steps T50 to T70, and steps T80 to T100 are not necessarily part of the same process, but are included on the same signaling chart for conciseness.

A Neighbor Advertisement message is sent by a node and may contain its LLA.

At step T10 or step T20, a Neighbor Solicitation is sent by the host 2 to all nodes in order to request any node in the network to send Neighbor Advertisement.

RFC4861 defines a bit in Neighbor Advertisement that indicates if the message is sent by a router.

In embodiments of the disclosure, the modem 4 is configured so that it will modify any Neighbor Advertisement from a router 16 by changing (or adding if not present) the LLA that it will generate itself.

If the source address of a Neighbor Solicitation is the unspecified address (::), as in step T10, then this Neighbor Solicitation is sent as part of the Duplicate Address Procedure (the host 2 checks if its address is not already used by another node).

However, if this address is different from the unspecified address, as in step T20, then the Neighbor Solicitation message is part of the Address Resolution procedure (the host 2 tries to get the LLA of the target node). In embodiments of the disclosure, at step T30 the modem 4 will intercept any Neighbor Solicitation with source address different from the unspecified address and at step T40 reply to it with a LLA that it has generated itself.

At steps T60 and T70, and at steps T80 and T90, the modem 4 will also intercept any Neighbor Advertisement message sent out by the router 16 and forward a modified message to the host 2 in manner analogous to that described in relation to FIG. 4.

In embodiments, there could be several PDP contexts or EPS bearer contexts that each connect one single modem 4 to one single APN 12. In that case the modem 4 will provides the host with as many interfaces (PPP or Ethernet depending on the connection manager) as PDP contexts. The IP stack on host side will use these interfaces separately and try to get the physical identifier of the first IPv6 routers over every Ethernet interface even if these IPv6 routers are the same device.

It will be appreciated that the above embodiments have been described only by way of example, and other variants or applications may be apparent to a person skilled in the art given the disclosure herein. For instance, while embodiments above have been described in relation to certain standards such as Ethernet, 3GPP networks, IPv6 and so forth, these are not intended to be limiting and the disclosure may in fact be applied wherever a host equipment tries to obtain internet connectivity on a cellular network via a modem and the connection between host and modem is driven by a point-to-multipoint link protocol whilst the connection between modem and cellular network is driven by a point-to-point link protocol. The present invention is not limited by the example embodiments but only by the appended claims.

The invention claimed is:

1. An apparatus comprising a wireless modem for use at a terminal, the modem being adapted to connect to the terminal via a first connection, and to connect via a second, wireless connection to a gateway between a wireless cellular network and a further, packet-based network;

wherein the modem is operable to connect to the gateway via said second connection using a point-to-point link protocol that does not require a physical address for the gateway, and is operable to connect to the host terminal via said first connection using a point-to-multipoint link protocol that supports point-to-multipoint connection and does require a physical address for the gateway; and wherein the modem is configured to intercept a message being conveyed between the gateway and the terminal, to generate a substitute address that identifies an interface of the modem, and in response to intercepting said message to communicate the substitute address to said terminal.

2. The apparatus of claim 1, wherein the message is being transmitted from gateway to the terminal without a physical address for the gateway being included in the message, and the modem is configured, in response to intercepting said message, to modify the message so as to include the substitute address, and to communicate the substitute address to said terminal by routing the message to said terminal via the first connection following said modification.

3. The apparatus of claim 2, wherein the message is one of a neighbour advertisement message and a router advertisement message from the gateway.

4. The apparatus of claim 1, wherein the message is being transmitted from the terminal to the gateway with a specified physical source address for said terminal being included in the message, and the modem is configured, in response to intercepting said message, to prevent the message being transmitted on to the gateway and instead to return a response including the substitute address to said terminal via the first connection.

5. The apparatus of claim 4, wherein the message is one of a neighbour solicitation message and a router solicitation message from the terminal.

6. The apparatus of claim 5, wherein the point-to-multipoint link protocol allows for neighbour solicitation messages with an unspecified physical source address, and the modem is configured such that said prevention of the message being transmitted on to the gateway and said response to the terminal are conditional on the neighbour solicitation message comprising a specified physical source address, whereas a neighbour solicitation message comprising the unspecified address will not be prevented from being transmitted on to the gateway.

7. The apparatus of claim 1, wherein the further network is the Internet.

8. The apparatus of claim 1, wherein the mobile cellular network is a 3 GPP network.

9. The apparatus of claim 1, wherein the modem is configured to operate in a selected one of at least two available modes, a mode in which the modem uses said point-to-multipoint link protocol on said first connection and a mode in which the modem uses a point-to-point link protocol on the first connection, the modem being configured to intercept said message on condition that the point-to-multipoint link protocol is currently being used.

10. The apparatus of claim 1, wherein the second, connection between the modem and the gateway, comprises a plurality of point-to-point connections in the form of a plurality of contexts, and wherein the modem is configured to intercept messages on each of said contexts.

11. The apparatus of claim 1, wherein the point-to-multipoint link protocol is an Ethernet protocol.

12. The apparatus of claim 1, wherein the first connection, between the modem and the terminal, is a wired connection.

13. The apparatus of claim 12, wherein the apparatus comprises a dongle housing said wireless modem for plugging into said terminal.

14. The apparatus of claim 12, wherein the apparatus comprises the terminal, the terminal being a user terminal in the form of one of a desktop computer, a laptop computer, a tablet and a mobile telephone, and wherein the wireless modem is housed within the user terminal.

15. The apparatus of claim 1, wherein the first connection, between the modem and the terminal, is a local wireless connection.

16. A computer program product for operating a wireless modem for use at a terminal, the modem being adapted to connect to the terminal via a first connection, and to connect via a second, wireless connection to a gateway between a wireless cellular network and a further, packet-based network; wherein the computer program product comprises code embodied on a non-transitory computer-readable medium and configured so as when executed on the modem to perform operations of:
  connecting the modem to the gateway via said second connection using a point-to-point link protocol that does not require a physical address for the gateway;
  connecting the modem to the host terminal via said first connection using a point-to-multipoint link protocol that supports point-to-multipoint connection and does require a physical address for the gateway;
  operating the modem to intercept a message being conveyed between the gateway and the terminal;
  at the modem, generating a substitute address that identifies an interface of the modem; and
  in response to intercepting said message, communicating the substitute address from the modem to said terminal.

17. The computer program product of claim 16, wherein the message is being transmitted from gateway to the terminal without a physical address for the gateway being included in the message, and the code is configured, in response to intercepting said message, to modify the message so as to include the substitute address, and to communicate the substitute address to said terminal by routing the message to said terminal via the first connection following said modification.

18. The computer program product of claim 17, wherein the message is one of a neighbour advertisement message and a router advertisement message from the gateway.

19. The computer program product of claim 16, wherein the message is being transmitted from the terminal to the gateway with a specified physical source address for said terminal being included in the message, and the code is configured, in response to intercepting said message, to prevent the message being transmitted on to the gateway and instead to return a response including the substitute address to said terminal via the first connection.

20. The computer program product of claim 19, wherein the message is one of a neighbour solicitation message and a router solicitation message from the terminal.

21. The computer program product of claim 20, wherein the point-to-multipoint link protocol allows for neighbour solicitation messages with an unspecified physical source address, and the code is configured such that said prevention of the message being transmitted on to the gateway and said response to the terminal are conditional on the neighbour solicitation message comprising a specified physical source address, whereas a neighbour solicitation message comprising the unspecified address will not be prevented from being transmitted on to the gateway.

22. The computer program product of claim 16, wherein the further network is the Internet.

23. The computer program product of claim 16, wherein the mobile cellular network is a 3GPP network.

24. The computer program product of claim 16, wherein the code is configured to operate the modem in a selected one of at least two available modes, a mode in which the modem uses said point-to-multipoint link protocol on said first connection and a mode in which the modem uses a point-to-point link protocol on the first connection, the code being configured to intercept said message on condition that the point-to-multipoint link protocol is currently being used.

25. The computer program product of claim 16, wherein the second connection, between the modem and the gateway, comprises a plurality of point-to-point connections in the form of a plurality of contexts, and wherein the code is configured to intercept messages on each of said contexts.

26. The computer program product of claim 16, wherein the point-to-multipoint link protocol is an Ethernet protocol.

27. The computer program product of claim 16, wherein the first connection, between the modem and the terminal, is a wired connection.

28. The computer program product of claim 16, wherein the first connection, between the modem and the terminal, is a local wireless connection.

29. A method of operating a wireless modem for use at a terminal, the modem being adapted to connect to the terminal via a first connection, and to connect via a second, wireless connection to a gateway between a wireless cellular network and a further, packet-based network; wherein the method comprises:
- connecting the modem to the gateway via said second connection using a point-to-point link protocol that does not require a physical address for the gateway;
- connecting the modem to the host terminal via said first connection using a point-to-multipoint link protocol that supports point-to-multipoint connection and does require a physical address for the gateway;
- operating the modem to intercept a message being conveyed between the gateway and the terminal;
- at the modem, generating a substitute address that identifies an interface of the modem; and
- in response to intercepting said message, communicating the substitute address from the modem to said terminal.

* * * * *